United States Patent [19]

Heinrich et al.

[11] 3,959,250

[45] May 25, 1976

[54] BISAZO DYESTUFFS OF THE 2,6-DIAMINOPYRIDINE

[75] Inventors: Ernst Heinrich; Konrad Mix, both of Frankfurt am Main; Joachim Ribka, Offenbach (Main) - Burgel, all of Germany

[73] Assignee: Cassella Farbwerke Mainkur Aktiengesellschaft, Germany

[22] Filed: Feb. 1, 1974

[21] Appl. No.: 438,616

[30] Foreign Application Priority Data

Feb. 10, 1973 Germany............................ 2306673

[52] U.S. Cl. .............................................. 260/156
[51] Int. Cl.² ........................................ C09B 31/14
[58] Field of Search .................................... 260/156

[56] References Cited
UNITED STATES PATENTS

| 2,068,353 | 1/1937 | Schneiderwirth................... 260/156 |
| 2,145,579 | 1/1939 | Binz et al........................... 260/156 |
| 2,148,705 | 2/1939 | Mietzsch et al................. 260/156 X |
| 2,681,906 | 6/1954 | Granatek et al.................... 260/156 |
| 3,042,648 | 7/1962 | Lewis............................. 260/154 X |
| 3,531,457 | 7/1970 | Ackermann et al. ............... 260/154 |
| 3,531,458 | 7/1970 | Ackermann et al. ............... 260/154 |
| 3,817,975 | 6/1974 | Berrie et al..................... 260/154 X |
| 3,853,895 | 12/1974 | Lamm et al........................ 260/156 |

FOREIGN PATENTS OR APPLICATIONS 6,918,333   6/1970   Netherlands........................ 260/156

*Primary Examiner*—Charles F. Warren
*Attorney, Agent, or Firm*—Connolly and Hutz

[57] ABSTRACT

Bisazo dyestuffs of the 2,6-diaminopyridine series, wherein the azo moieties are interconnected by an aromatic moiety preparation thereof and their utility in textile printing lacquers, printing dyes and in bulk dyeing of synthetics.

13 Claims, No Drawings

BISAZO DYESTUFFS OF THE 2,6-DIAMINOPYRIDINE

This invention relates to a bisazo dyestuff of the formula

    I wherein each of Q and $Q_1$ is a radical of the formula

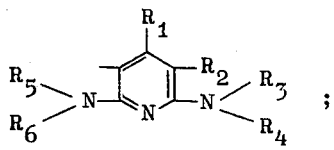 ;

A is a radical of the formulae

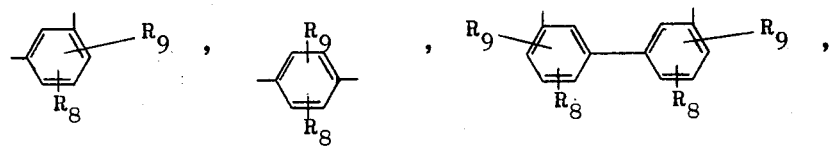,

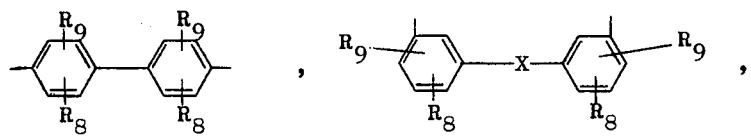,

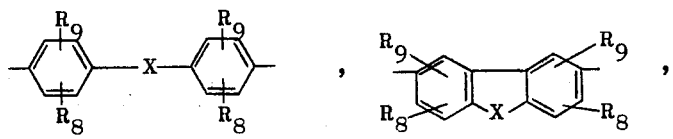,

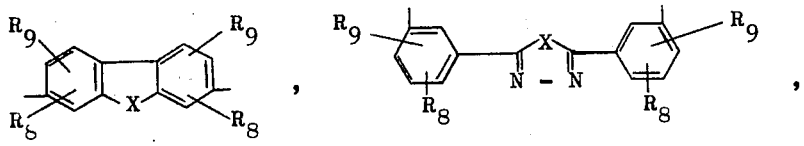, or

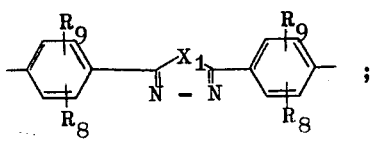 ;

$R_1$ having 1 to 3 carbon atoms; $R_2$ is cyano or $-CONH_2$; each of $R_3$ and $R_5$ is hydrogen, methyl, $-C_2H_4OH$, $-CH_2CH(OH)CH_3$, $-CH_2CH_2CH_2OH$, $-C_2H_4CONH_2$, benzyl, phenethyl, cyclopentyl, cyclohexyl or

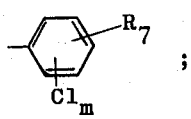 ;

each of $R_4$ and $R_6$ is hydrogen, alkyl having 1 to 3 carbon atoms, $-C_2H_4OH$, $-CH_2CH(OH)C-H_3-C_2H_4CN$ or $-CH_2CH_2CH_2OH$; $R_7$ is hydrogen, methyl, methoxy, $-NHCOCH_3$ or $-NHCOC_6H_5$; $m$ is 0, 1, 2 or 3; each of $R_8$ and $R_9$ is hydrogen, halogen, nitro, methyl or methoxy; X is $-O-$, $-S-$, $$-\overset{|}{\underset{|}{C}}-\quad -\overset{}{\underset{O}{C}}-$$

or $-SO_2-$ and $X_1$ is $-O-$, $-S-$ or $-NH-$.

The preferred radials for A are

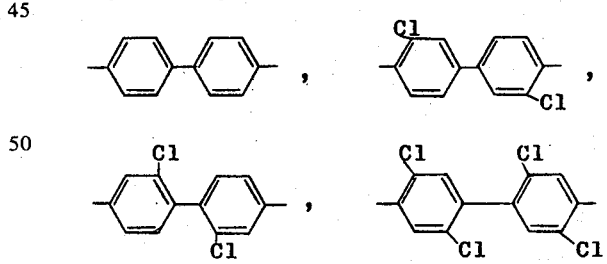

more particularly the radicals

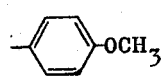

Preferred substituent for $R_4$ and $R_6$ is hydrogen. Preferred substituents for $R_3$ and $R_5$ are hydrogen, methyl, ethyl, $-C_2H_4OH$, $-C_6H_5$ or

and for $R_1$ is methyl and for $R_2$ is cyano.

The dyestuffs of formula I may be prepared by tetraazotizing one mole of a diamine of the formula:

$H_2N - A - NH_2$    II and coupling with 2 moles of a coupling constituent of the formula:

HQ    IIIa or a total of 2 moles of a mixture of two coupling components of the formulas:

HQ + HQ$_1$
IIIa IIIb

In the coupling with a single coupling component, there are obtained bisazo dyestuffs of formula I wherein $Q_1$ is identical to Q. If in the coupling, a mixture of two different coupling constituents HQ and HQ$_1$ is used, preferably an equimolar mixture of HQ and HQ$_1$, there are obtained according to the invention bisazo dyestuffs of formula I wherein Q is different from $Q_1$ in admixture with symmetrical bisazo dyestuffs. The symmetrical bisazo dyestuffs of formula I, wherein Q and $Q_1$ are identical, are preferred.

The preferred halogen substituent for $R_8$ and $R_9$ is chlorine or bromine.

Suitable diamines of formula II are, for example:
m-phenylenediamine
p-phenylenediamine
benzidine
2,2'-dichlorobenzidine
2,2'-dibromobenzidine
3,3'-dibromobenzidine
3,3'-dichlorobenzidine
3,3'-dimethylbenzidine
2,2'-dimethylbenzidine
3,3'-dimethoxybenzidine
2,2'-dimethoxybenzidine
2,2',5,5'-tetrachlorobenzidine
2,2'-dichloro-5,5'-dimethoxybenzidine
4,4'-diaminodiphenyl ether
4,4'-diaminodiphenyl sulfide
4,4'-diaminobenzophenone
3,3'-diaminobenzophenone
4,4'-diaminodiphenylsulfone
2,7-diaminofluorenone
3,6-diaminofluorenone
3,6-diaminodiphenyleneoxide
3,6-diamino-diphenylene sulfide
2,5-di-(p- or -m-aminophenyl)-oxydiazole (1,3,4)
2,5-di-(p- or -m-aminophenyl)-thiadiazole (1,3,4)
3,5-di-(p- or -m-aminophenyl)-triazole (1,2,4)

The diamines of formula II are tetra-azotized in a manner known per se. See, in this connection, Houben-Weyl: Methoden der Organischen Chemie, Band X/3 Stickstoffverbindungen, Verlag Georg Thieme, Stuttgart 1965, S.16-47 (Houben-Weyl: Methods of Organic Chemistry, Vol. X/3 Nitrogen Compounds, Georg Thieme publisher, Stuttgart 1965, pp. 16–47). The tetra-azotized diamines are subsequently coupled in a manner known per se. Normally, tetra-azotization occurs in an aqueous medium or in an inorganic or organic acid at temperatures of 0° to 10°C. under the effect of nitrous acid. For producing nitrous acid, sodium nitrile and an acid, e.g., sulfuric acid or nitrosyl sulfuric acid, are customarily employed. In the tetraazotization of m-phenylenediamine and its derivatives, the known special methods (see Houben-Weyl, loc. cit., p. 40) are suitably employed, in that the tetra-azotization is undertaken, for example, at −5°C. in a very large excess of strong hydrochloric acid with the drop-by-drop additon of a sodium nitrite solution.

Paraphenylene diamine and its derivatives may be easily tetra-azotized in concentrated sulfuric acid or in mixtures of sulfuric acid and phosphoric acid or of sulfuric acid and glacial acetic acid (see Houben-Weyl), loc. cit., p. 42).

With negatively substituted diamines, the tetra-azotization is appropriate in concentrated acids, such as concentrated sulfuric acid, phosphoric acid or nitric acid (see Houben-Weyl, loc. cit., p. 22).

For carrying out the coupling, the tera-azo solution is combined with a solution or suspension of the coupling component. The coupling component may be dissolved or suspended in water acidified with sulfuric acid or also dissolved or suspended in a suitable inert, water-miscible solvent, such as methanol, ethanol, acetone, glacial acetic acid, dimethylformamide, m-methylpyridone, dioxan, sulfolan, glycol, glycol ether, acetonitrile and similar solvents. In some instances, it may be suitable to buffer the pH during coupling, e.g., by the addition of sodium acetate. In the coupling, there may also be added surface-active agents, emulsifiers, resin soaps and similar auxiliary agents customarily employed in the preparation of azo pigments.

For an acceleration of the coupling, there may also be added catalysts such as pyridine. The coupling may be carried out at temperatures of 0° to 25°C., for example.

In each instance, it is recommended to adjust the input speed of the tetrazonium salt solution to the coupling speed.

After coupling completion, the dyestuffs may be isolated by filtration and by washing with water and optionally purified with solvents. Following or even preceding the isolation, one may thermally influence particle size distribution, by heating a suspension of the pigment in water, organic solvents or mixtures of solvents. In such case, water may be present or absent and the liquid composition may be single or multiphase.

The coupling components, HQ and HQ$_1$, required for the preparation of the disazo dyestuffs of this invention may be synthesized from 2,6-dihydroxypyridine derivatives of the formula:

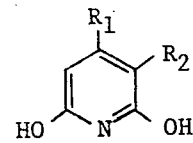

IV

Compounds of formula IV may be prepared in a known manner by the condensation of cyanoacetamide or malonic acid diamide with correspondingly substituted β-ketocarboxylic acid esters analogous to the method described by Bobbitt and Scola, Journ. of Org. Chem. 25, 560. They may also be prepared in accodance with the various further methods described, for example, in the monograph, "Heterocyclic Compounds, Pyridine and Its Derivatives, Part 3" by Klingsberg. This monograph has appeared in the Arnold Weissberger series "The Chemistry of Heterocyclic Compounds", published by Interscience Publishers.

The 2,6-dihydroxypyridine derivaives of formula IV are converted in accordance with Bobbitt and Scola, Journal of Organic Chemistry, 25, 560, at 180°C. by means of phosphorus oxychloride or analogously by means of phosphorus oxybromide into the corresponding 2,6-dichloro or 2,6-dibromo pyridine derivatives of the formula:

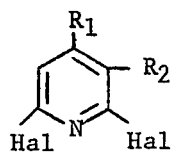

V

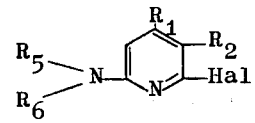

VIII wherein $R_1$ and $R_2$ have the initially stated meaning and Hal is bromine or preferably chlorine.

Coupling components, HQ or $HQ_1$, wherein the radicals

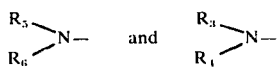

are the same (compounds of formula VII), may be prepared from compounds of formula V in accordance with the following reaction scheme:

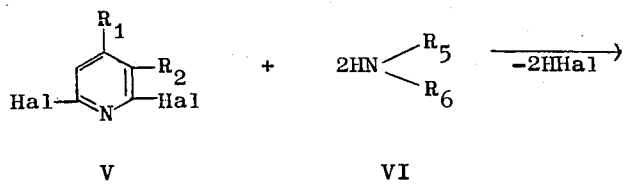

wherein a compound of formula V is reacted with an amine of formula VI in a molar ratio of at least 1 : 2 in a suitable solvent at temperatures of 20° to 200°C. Suitable solvents include, for example, alcohols, ether and hydrocarbons such as benzene, toluene and xylene. The alcohols used as solvents preferably have from 1 to 4 carbon atoms.

If compounds of formula V are reacted with the amine of formula VI in a molar ratio of 1 : 1, then a compound of formula VIII is obtained:

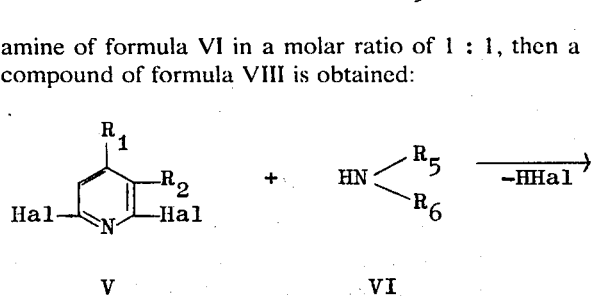

This reaction is carried out at temperatures of 20°–100°C., and preferably 20°–50°C., in a suitable inert solvent. The exchange of the chlorine or bromine atom in the 6-position of the pyridine nucleus is determined by analysis of the NMR absorption spectra of the compounds obtained from formula VIII. The preferred inert solvents are alcohols with a chain length of 1 to 4 carbon atoms such as methanol, isopropanol and n-butanol.

The compound of formula VIII may be further reacted with an amine of formula IX to the desired coupling compound X as shown by:

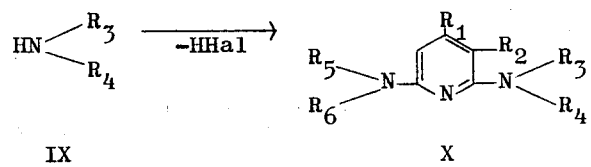

In this reaction, the reactants are heated to 100°–200°C. and preferably 160°–180°C., in an inert solvent, preferably an alcohol with a chain length of 1 to 4 carbon atoms, e.g., methanol, propanol, isobutanol or, in the event the physical properties allow it, in an excess of one of the reactants as the solvent.

The novel bisazo dyestuffs of formula I are yellow to violet pigments having good fastness to light and solvent fastness. Their properties, particularly particle size distribution, are dependent on the preparation conditions. These may be influenced by measures known from the literature, as already have been mentioned to some extent, but, in addition, also by mechanical processing such as milling with or without the addition of auxiliary milling materials so as to adapt the properties to particular purposes.

Of the dyes of general formula I those exhibit particularly good fastness properties, in particular fastness to light and specially good qualities from the utilization view-point, such as a good fastness to over-lacquering, which correspond to formula Ia

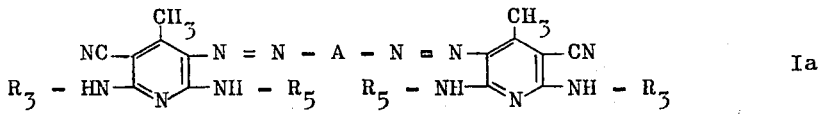

wherein each of $R_3$ and $R_5$ being hydrogen, methyl, ethyl, $-C_2H_4OH$, $-C_6H_5$ or

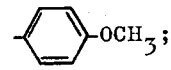

and A is a radical of the formula

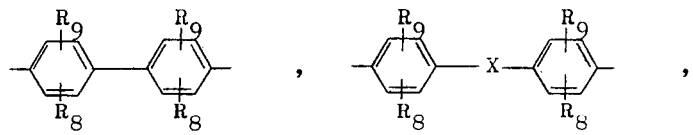

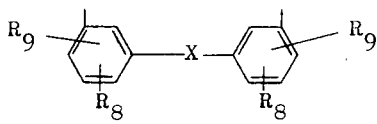

In addition to these dyes of formula Ia those dyes of formula Ia are specially preferred in which A stands for a radical of the formula

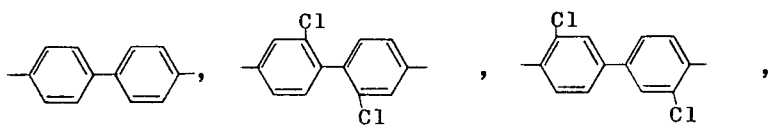

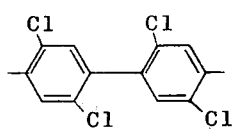

and in which $R_3$ and $R_5$ have the definition given in formula Ia.

Preferred compounds are also those of formula Ia wherein the substituents of $R_3$ and $R_5$ are identical and, consequently, correspond to the formula

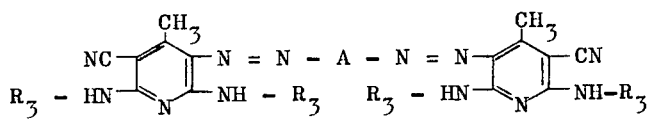   Ib $R_3$ and A having the meanings given in formula Ia and A standing preferentially for a radical of the formula

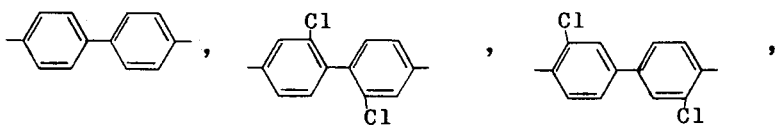

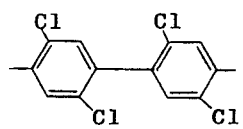

The novel pigments may be employed, among other things, in textile printing, in lacquers, printing dyes and in the bulk dyeing of synthetics.

The lacquers under consideration are those which contain, for example, acrylates, melamine resins, urea formaldehyde, condensation products, alkyd resins or varnish. Color printing in which the novel pigments may be employed, for example, includes book printing, offset printing and textile printing. The bisazo dyestuffs of formula I may also be used advantageously for the pigment dyeing of textiles.

The synthetics, which may be dyed with the bisazo dyestuffs of formula I include, for example, polyvinyl chloride, polystyrene and caoutchouc.

Furthermore, the bisazo dyestuffs of formula I may also be employed for the spin dyeing of polymeric compositions from solutions, for example, of a xanthogenic cotton solution, or from melts, for example, of polyesters, cellulose acetate, polystyrene, polyvinyl chloride and polyolefins.

With the novel brilliant pigments having a good color strength are achieved good fastnesses to light, oil, over-lacquering, over-spraying and migration in the printing, dyeing or lacquering produced thereby.

In the following examples, temperatures are in degrees Centigrade, percent data in weight percent and parts are parts by weight.

EXAMPLE 1 a. Preparation of the Tetrazonium Salt Solution

There are introduced 24.5 g. 3,3'-dichlorobenzidine into 132 ml 5N-HCl and 73 ml water and the mixture is stirred. After the addition of ice and water, it is tetraazotized at 0°C. with 40.5 ml 5N-sodium nitrite solution. After 30 minutes, the nitrite excess is removed with amidosulfonic acid and the solution is clarified with diatomaceous earth.

b. Preparation of the Suspension of the Coupling Component

There are dissolved 29.6 g. of 2,6-diamino-3-cyano-4-methylpyridine in a mixture of 10 g. of nonylphenol polyglycol ether with 30 ethyleneoxide units, 400 ml 1.5 molar sodium acetate solution and 400 ml ethanol. This solution is subsequently stirred into a composition consisting of 200 g. ice, 200 ml water and 80 ml 25 % acetic acid. By the addition of iced water, the composition obtained is brought to a volume of 1600 ml and a temperature of 25°C.

c. Coupling

The tetrazonium solution (a), maintained cold, is introduced within 40 minutes at 25°C. into the suspension of the coupling component (b) while maintaining the pH at 5 or above. Upon the completion of the addition of the terazonium solution, the reaction mixture is agitated for 3 hours. A slight excess of the coupling component, but no tetrazo constituent, is then still detectable. The precipitated product is then recovered and thoroughly washed with water and dried at 60°C. in a recirculating air tank.

There are obtained 56 g. of a blue-red pigment powder of the formula

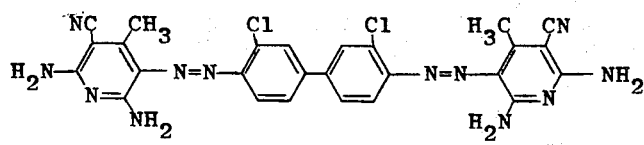

which is completely insoluble in organic solvents.

The coupling component may be prepared by adding to 320 parts by weight ethyl alcohol and 83.7 parts by weight 2,6-dichloro-3-cyano-4-methylpyridine which are in an autoclave, 51.0 parts by weight liquid ammonia. Subsequently, the reaction liquid is heated 18 hours at 200°C. Upon cooling, the ethyl alcohol is then distilled off, the residue stirred up with 400 parts by weight water, recovered, washed with water and dried. The resulting 2,6-diamino-3-cyano-4-methylpyridine may be purified by crystallization from ethyl alcohol.

EXAMPLE 2 a. Preparation of the Tetrazonium Salt Solution

A tetrazonium salt solution is prepared as in Example 1 (a), except that 21 g. 4,4'-diaminodiphenylether is used in place of the 3,3'-dichlorobenzidine.

b. Preparation of the Suspension of the Coupling Component

The preparation of the suspension of the coupling component is the same as in Example 1 (b).

c. Coupling

The terazonium salt solution (a), maintained cold, is stirred into the suspension of the coupling component (b) within 3 hours at 50°C., the pH being maintained at 5.5. Upon completion of the addition of the terazonium salt solution, it is again stired for 3 hours at 50°C. The precipitated product is recovered and thoroughly washed with water and ethanol After drying at 60°C., there are obtaind 50 g. of a reddish-yellow pigment powder of the formula

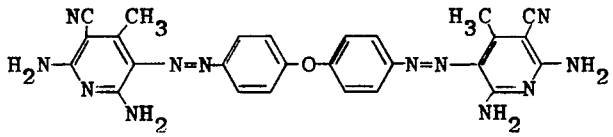

which is insoluble in organic solvents.

EXAMPLE 3 a. Preparation of the Tetrazonium Salt Solution

A tetrazonium salt solution is prepared as in Example 1 (a), except the 3,3'-dichlorobenzidine is replaced by 31.2 g. tetrachlorobenzidine (in the form of a fine-particle suspension in hydrochloric acid).

b. Preparaton of the Suspension of the Coupling Component

The preparation of the suspension of the coupling component is the same as in Example 1(b).

c. Coupling

The tetrazonium salt solution (a), maintained cold, is stirred into the suspension of the coupling component (b) within 40 minutes at 18°C. Subsequently, it is stirred 3 hours at room temperature. Then the composition is mixed with an equal amount of n-propyl alcohol and maintained at 150°C. for 6 hours. Upon cooling, the dyestuff is recovered, washed salt-free with water and dried at 60°C. in a recirculating air tank.

There are obtained 62 g of an orange pigment powder, insoluble in organic solvents, of the formula

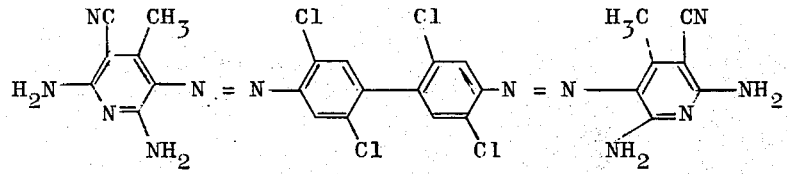

Lacquerings prepared therewith are distinguished by their great light fastness and over-lacquering fastness.

EXAMPLE 4 a. Preparation of the Tetrazonium Salt Solution

There are introduced 14 g 3,3'-dinitro-4,4'-diaminobenzophenone at 20°C. into 87 g 14.6% nitrosyl sulfuric acid and the mixture is stirred overnight. Subsequently, it is poured over 240 g ice, the nitrite excess is removed with amidosulfonic acid and the light yellow solution, which is constantly maintained at 0°C., is filtered.

b. Preparation of the Coupling Component Solution

There are dissolved 14.8 g 2,6-diamino-3-cyano-4-methylpyridine in 300 ml dimethylformamide and 200 ml 1.5 molar sodium acetate solution and 200 ml alcohol and 5 g of a nonylphenol polyglycol ether with 30 ethylene oxide radicals. This solution is stirred into a composition consisting of 100 g ice, 100 g water and 40 ml 25% acetic acid, so that the temperature does not exceed 10°C. A clear solution is obtained.

c. Coupling

The coupling component solution (b) is adjusted to 5°C. and the tetrazonium salt solution (a) is added drop-by-drop below the surface at 0° to 5°C. At the same time, the pH is maintained between 4 and 4.5 by the addition of 1.5 molar sodium acetate solution. The dyestuff suspension is stirred for several hours. Subsequently, the dyestuff is isolated by filtration and freed of impurities by washing with water and hot dimethylformamide.

There are obtained 31 g of a red pigment powder of the formula

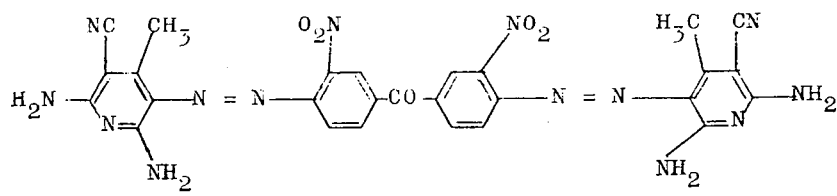

which is insoluble in organic solvents.

Lacquerings prepared therewith are distinguished by great light fastness and great over-lacquering fastness.

EXAMPLE 5

The procedure is the same as in Example 4, but in place of the dinitrodiaminobenzophenone, an equivalent quantity of dinitrodiaminodiphenylsulfone is employed. There is obtained a red pigment dyestuff of the formula

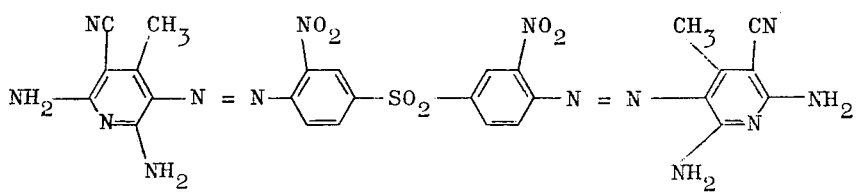

EXAMPLE 6 a. Preparation of the Tetrazonium Salt Solution

A tetrazonium salt solution is prepared as in Example 1(a).

b. Preparation of the Coupling Component Solution

There are dissolved 60 g 2,6dianilino-3-cyano-4-methylpyridine in 1200 ml dimethylformamide, 600 ml ethanol and 400 ml 1.5 molar sodium acetate solution. This solution is mixed with 10 g of a nonylphenol polyglycol ether with 30 ethylene oxide radicals and with 80 ml 25% acetic acid.

c. Coupling

The coupling component solution (b) is adjusted to 30°C. The tetrazonium salt solution (a) is maintained at 0°C. and slowly dripped into the coupling component solution. By the addition of sodium acetate solution, the pH is maintained at 5.5 to 6. After the addition of the tetrazonium salt solution, the reaction mixture is stirred for 3 hours. Subsequently, the dyestuff is isolated by filtration and freed of impurities with water and hot dimethylformamide. There are obtained 70 g of a red-violet insoluble pigment powder of the formula

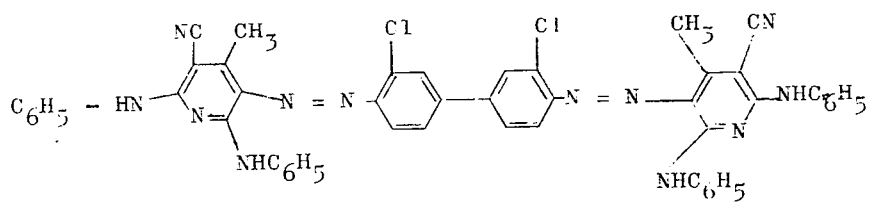

Lacquerings prepared therewith are distinguished by great light fastness and great over-lacquering fastness.

The necessary coupling component may be prepared by introducing 37.2 parts by weight 2,6-dichloro-3-cyano-4-methylpyridine into 150.0 parts by weight aniline. This reaction solution is then heated 24 hours at 150°C. and subsequently decomposed over 1000 parts by weight ice with the addition of 350 parts by weight crude hydrochloric acid (D = 1.153). The resulting 2,6-dianilino-3-cyano-4-methylpyridine may be purified by crystallization from ethyl alcohol.

EXAMPLE 7

If the tetrazonium salt solution of dichlorobenzidine obtained in accordance with Example 3(a) is coupled to the coupling component solution of 2,6-dianilino-3-cyano-4-methylpyridine, described in Example 6(b), then a maroon colored pigment powder is obtained having the formula

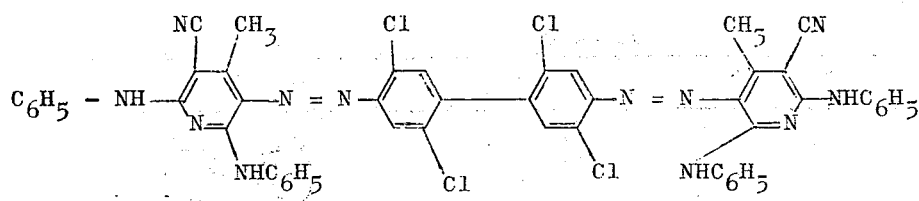

This pigment is insoluble in organic solvents. Lacquerings prepared therewith are distinguished by great light fastness and great over-lacquering fastness.

EXAMPLE 8 a. Preparation of the Tetrazonium Salt Solution

As described in Example 1(a), with respect to the tetra-azotization of dichlorobenzidine, 23.6 g 3,3'-dianisidine are tetra-azotized.

b. Preparation of the Coupling Component Solution

The preparation of the coupling solution is the same as in Example 1(b).

c. Coupling

The coupling component solution is adjusted to 50°C. and the terazonium salt solution is added drop-by-drop within 4 to 5 hours. The pH is maintained between 5.0 and 5.5 by the addition of sodium acetate solution. After completion of the addition of the tetrazonium salt solution, the reaction mixture is stirred for 3 hours at 50°C. Then the dyestuff is isolated by filtration and washed with water. Subsequently, it is dried at 60°C. in a recirculating air tank..

There are obtained 54 g. of a blue-red pigment dyestuff, insoluble in organic solvents having the formula

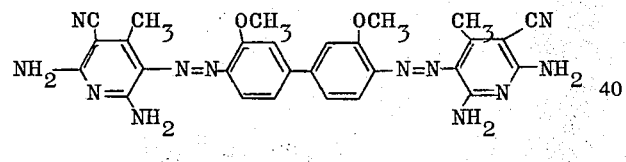

EXAMPLE 9

There are dissolved 10 g. 2,6-diamino-3-cyano-4-methylpyridine in 200 ml dimethylformamide and 20 ml glacial acetic acid. In the course of 4 hours a suspension of 10 g. benzene-m-bis-diazonium tetrafluoroborate in 50 ml glacial acetic acid is stirred into this solution at 5°C. Upon further stirring at room temperature for several hours, the precipitated product is recovered on a suction filter, washed with dimethylformamide and ethanol and dried. There is obtained a yellow pigment dyestuff having the formula

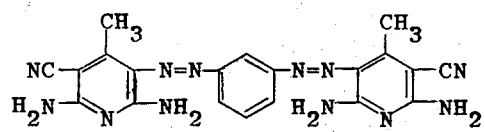

EXAMPLE 10

There are dissolved 10 g. 2,6-diamino-3-cyano-4-methylpyridine in 200 ml dimethylformamide and 20 ml glacial acetic acid. In the course of 4 hours, 10 g. benzene-p-bisdiazonium tetrafluoroborate are stirred into this solution at 5°C., and, subsequently, in the course of another hour, 6.6 g. triethylamine are dripped in. After stirring at room temperature for several hours, the precipitated product is recovered, washed with dimethylformamide, ethanol and water and dried. There are obtained 13.3 g. of a red pigment dyestuff having the formula

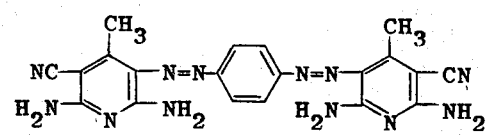

The pigment dyestuffs given in the following table were prepared analogously to those in the preceding examples. These dyestuffs have the formula

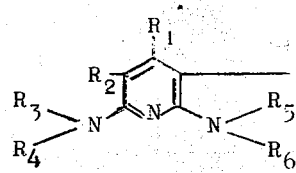

XI

This formula corresponds to formula I when $Q = Q_1$.

| $R_1$ | $R_2$ | $R_3$ | $R_4$ | $R_5$ | $R_6$ | —A— | Colors of Pigment |
|---|---|---|---|---|---|---|---|
| $C_2H_5$ | CN | H | $CH_3$ | H | $CH_3$ | ![Br-biphenyl-Br] | red |
| $CH_3$ | CN | $C_2H_4OH$ | H | H | $C_2H_5$ | ![Cl-biphenyl-Cl] | crimson |

-continued

| R₁ | R₂ | R₃ | R₄ | R₅ | R₆ | —A— | Colors of Pigment |
|---|---|---|---|---|---|---|---|
| CH₃ | CONH₂ | C₂H₄OH | H | C₂H₄OH | H | 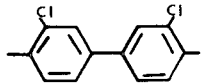 | red |
| CH₃ | CN | C₂H₄OH | H | C₂H₄OH | H | 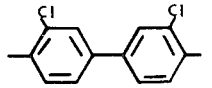 | red |
| CH₃ | CN | C₂H₄OH | H | C₂H₄OH | H | 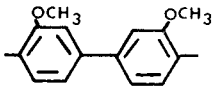 | blue-red |
| CH₃ | CN | C₂H₄OH | H | C₂H₄OH | H | 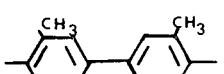 | scarlet |
| n-C₃H₇ | CONH₂ | C₂H₄OH | CH₃ | C₂H₄OH | CH₃ | 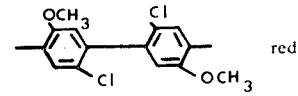 | red |
| CH₃ | CN | C₂H₄OH | H | H | C₂H₅ | 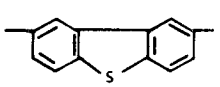 | orange |
| CH₃ | CN | C₂H₄OH | C₂H₅ | —CH₂C₆H₅ | n-C₃H₇ | 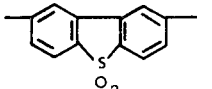 | red |
| CH₃ | CN | —C₆H₅ | C₂H₄OH | —C₆H₅ | C₂H₄OH | 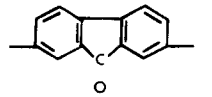 | claret |
| CH₃ | CONH₂ | 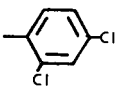 | H | 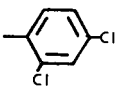 | H | 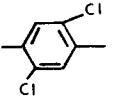 | blue |
| CH₃ | CN | 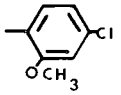 | H | 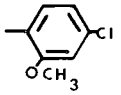 | H | 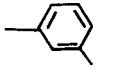 | red |
| CH₃ | CN | C₂H₄CN | H | —C₂H₄CN | H |  | red |
| CH₃ | CN | C₂H₄CONH₂ | H | —CH₂—CHOHCH₃ | —CH₂CHOH—CH₃ | 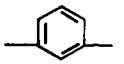 | yellow |
| CH₃ | CN | —C₆H₅ | H | —C₆H₅ | H | 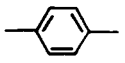 | blue-violet |

-continued

| $R_1$ | $R_2$ | $R_3$ | $R_4$ | $R_5$ | $R_6$ | —A— | Colors of Pigment |
|---|---|---|---|---|---|---|---|
| $CH_3$ | CN | —$C_6H_5$ | H | —$C_6H_5$ | H | *p-phenylene* | scarlet |
| $CH_3$ | CN | 2,4,5-trichlorophenyl | H | 2,4,5-trichlorophenyl | H | 2,2'-dichlorobiphenyl-4,4'-diyl | lilac |
| $C_2H_5$ | $CONH_2$ | —$C_6H_5$ | H | —$C_6H_5$ | H | 4,4'-thiodiphenylene | gold-orange |
| i-$C_3H_7$ | $CONH_2$ | —$C_6H_5$ | H | —$C_6H_5$ | H | dibenzofuran-diyl | gold-orange |
| $CH_3$ | CN | H | H | H | H | 2,5-bis(4-nitrophenyl)-1,3,4-oxadiazole-diyl | red |
| $CH_3$ | CN | H | H | H | H | 2,5-bis(4-nitrophenyl)-1,3,4-thiadiazole-diyl | red |
| $CH_3$ | CN | H | H | H | H | 3,5-diphenyl-1,2,4-triazole-diyl (NH) | red |
| $CH_3$ | CN | $CH_3$ | $CH_3$ | $CH_3$ | $CH_3$ | 3,3'-dichlorobiphenyl-4,4'-diyl | red-violet |
| $CH_3$ | CN | $CH_3$ | H | $CH_3$ | H | 3,3'-dichlorobiphenyl-4,4'-diyl | violet |
| $CH_3$ | CN | 4-($NHCOCH_3$)phenyl | H | 4-($NHCOCH_3$)phenyl | H | 2,2'-dichlorobiphenyl-4,4'-diyl | violet |
| $CH_3$ | CN | 4-($NHCOC_6H_5$)phenyl | H | 4-($NHCOC_6H_5$)phenyl | H | 2,2'-dichlorobiphenyl-4,4'-diyl | violet |
| $CH_3$ | CN | H | H | H | H | *m,m'-biphenylene* | yellow |

-continued

| $R_1$ | $R_2$ | $R_3$ | $R_4$ | $R_5$ | $R_6$ | —A— | Colors of Pigment |
|---|---|---|---|---|---|---|---|
| $CH_3$ | CN | $C_6H_5$ | H | $C_6H_5$ | H | 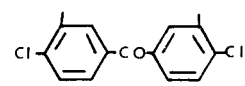 | orange |
| $CH_3$ | CN | $C_6H_5$ | H | $C_6H_5$ | H | 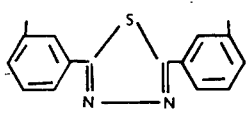 | orange |

EXAMPLE 11 a. Preparation of the Tetrazonium Salt Solution

Following the procedure of Example 1 (a), 24.5 g. 3,3'-dichlorobenzidine are tetra-azotized.

b. Preparation of the Coupling Component Solution

There are dissolved 14.8 g. 2,6-diamino-3-cyano-4-methylpyridine and 30 g. 2,6-dianilino-3-cyano-4-methylpyridine in 800 ml dimethylformamide, 400 ml ethanol and 300 ml of a 1.5 molar sodium acetate solution. This solution is mixed with 10 g. of a nonylphenol polyglycol ether with 30 ethylene oxide radicals and with 80 ml 25 % acetic acid.

c. Coupling

Coupling is carried out as in Example 6 (c).

There are obtained 48 g. of an intensely blue-red pigment powder of a high color strength, which is insoluble in organic solvents and allows the preparation of lightfast and over-lacquering fast lacquerings, as well as non-bleeding bulk dyeings of synthetic substances, such as polyvinyl chloride.

Further examples for couplings of this type are given in the following table. In this table are presented the substituents $R_1$ through $R_6$ of the coupling components HQ and $HQ_1$, as well as the radical —A— of the tetrazo component and the color of the dyestuff pigments obtained. The second column indicates the molar percentages for the coupling components HQ and $HQ_1$ in the coupling mixture HQ + $HQ_1$. The formula HQ or $HQ_1$ corresponds to the definition of Q or $Q_1$ of formula X.

| No. | Mol % | $R_1$ | $R_2$ | $R_3$ | $R_4$ |
|---|---|---|---|---|---|
| 1 | HQ 25 | —$CH_3$ | —CN | —H | —H |
|   | $HQ_1$ 75 | —$CH_3$ | —CN | —$C_6H_5$ | —H |
| 2 | HQ 50 | —$C_2H_5$ | —$CONH_2$ | —$C_6H_5$ | —H |
|   | $HQ_1$ 50 | —$CH_3$ | —$CONH_2$ |  | —H |
| 3 | HQ 50 | 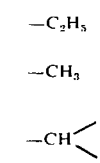 | —$CONH_2$ | —$C_6H_5$ | —H |
|   | $HQ_1$ 50 |  | —$CONH_2$ |  | —H |
| 4 | HQ 50 |  | —$CONH_2$ | —$C_6H_5$ | —H |
|   | $HQ_1$ 50 | —$CH_3$ | —CN | 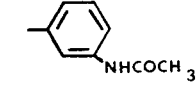 | —H |
| 5 | HQ 10 | —$CH_3$ | —CN | 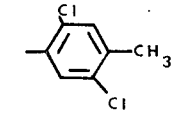 | —H |
|   | $HQ_1$ 90 | —$CH_3$ | —CN |  | —H |
| 6 | HQ 50 | —$CH_3$ | —CN | —$C_2H_4$—$C_6H_5$ | —$C_2H_4CN$ |
|   | $HQ_1$ 50 | —$CH_3$ | —CN | —$CH_3$ | —$CH_3$ |
| 7 | HQ 50 | —$CH_3$ | —CN | —$C_6H_5$ | —$CH_3$ |
|   | $HQ_1$ 50 | —$CH_3$ | —CN | —$C_6H_5$ | —H |
| 8 | HQ 65 | —$CH_3$ | —CN | 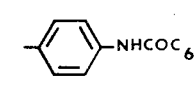 | —H |
|   | $HQ_1$ 35 | —$CH_3$ | —CN | —H | —H |

-continued

| No. | $R_5$ | $R_6$ | —A— | Color of Pigments |
|---|---|---|---|---|
| 1 | —H 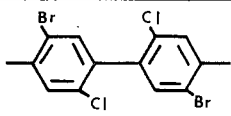 —C₆H₅ | H H | 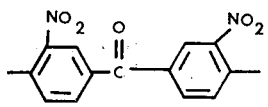 | red-brown |
| 2 | —H 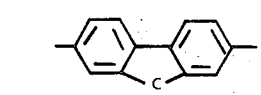 | H H | 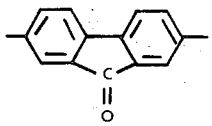 | bordeaux |
| 3 | —C₆H₅ 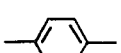 | H H | 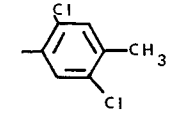 | red |
| 4 | —C₆H₅ 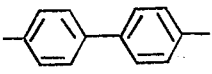 | H H | 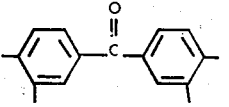 | blue |
| 5 | 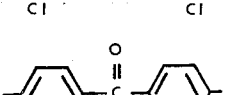 | H H | 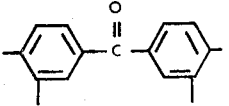 | red |
| 6 | —C₂H₄C₆H₅ —H | —C₂H₄CN —H | 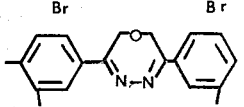 | red-orange |
| 7 | —C₆H₅ —C₆H₅ | —H —CH₃ |  | red-violet |
| 8 | —H  | —H —H | | blue-violet |

EXAMPLE 12

One part of the pigment prepared in accordance with Example 6 is finely ground with 10 parts boiled linseed oil on a three-roll mill. The printing ink prepared in this manner produces, on printing, red-violet prints with excellent brilliance and good light fastness. Similar results are achieved in employing the remaining pigments given in the examples, prints with the specified color hues being obtained.

Lacquerings with increased transparency are obtained if, for example, the pigments are milled in a ball mill with the addition, in a given case, of inorganic salts with the subsequent removal of these salts. Increased covering power may also be achieved by the heating of the pigments with water and/or organic solvents, for example.

EXAMPLE 13

A baking enamel mixture (95 parts) consisting of 67 parts coconut-oil resin, 17 parts urea formaldehyde resin and 16 parts ethylene glycol, is ground in a hopper mill with 8 parts of the pigment described in Example 7. The maroon colored lacquer thusly obtained, after burning in on metal sheets, cardboard or aluminium foil, produces maroon colored lacquerings with excellent over-spraying fastness. Similar results are achieved in using the remaining pigments, prepared in accordance with the examples, the color hues specified being obtained.

EXAMPLE 14

A mixture consisting of 70 parts polyvinyl chloride, 30 parts diisooctylphthalate and 1 part titanium dioxide is dyed in the customary manner with 0.5 parts of the pigment obtained in accordance with Example 1, in a set of mixing rollers heated to 160°C. There is obtained a bluish-red substance from which foils or profiles, for example, may be prepared. The dyeing is distinguished by intense brilliancy, as well as good plasticizer fastness. Similar results are obtained when employing the remaining pigments described in the examples.

What is claimed is:

1. A bisazo dyestuff of the formula $Q-N=N-A-N=N-Q_1$ wherein each of Q and $Q_1$ is a radical of the formula

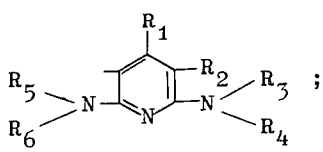

A is a radical of the formulae

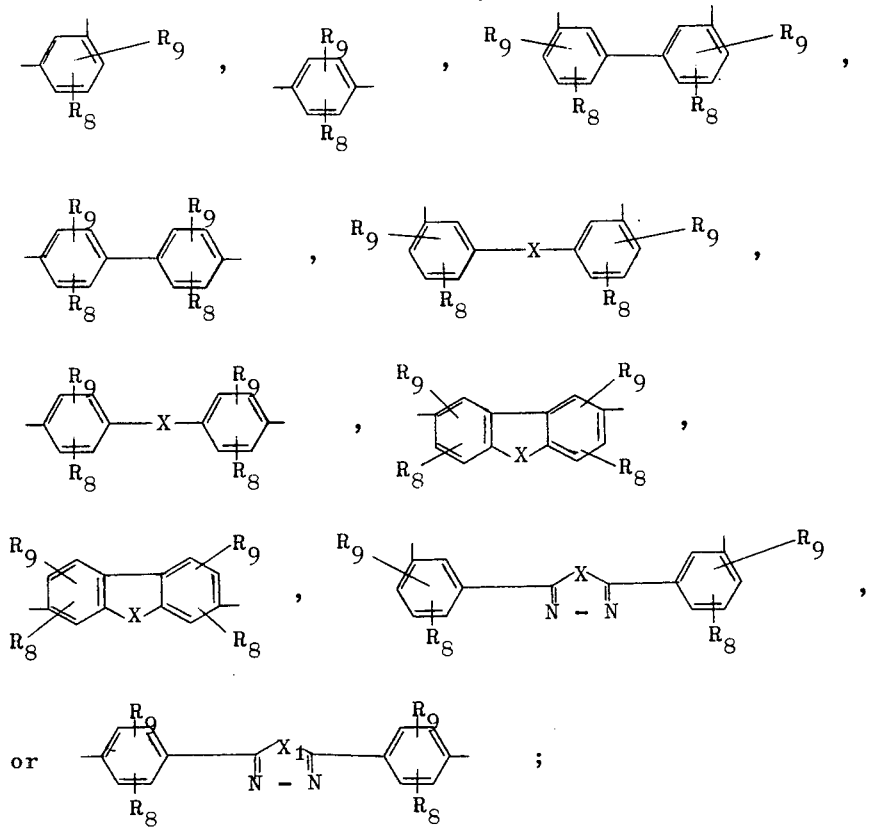

$R_1$ is alkyl having 1 to 3 carbon atoms; $R_2$ is cyano or $-CONH_2$; each of $R_3$ and $R_5$ is hydrogen, methyl, $-C_2H_4OH$, $-CH_2CH(OH)CH_3$, $-CH_2CH_2CH_2OH$, $-C_2H_4CONH_2$, benzyl, phenethyl, cyclopentyl, cyclohexyl or

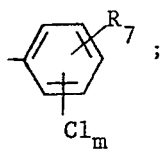

each of $R_4$ and $R_6$ is hydrogen, alkyl having 1 to 3 carbon atoms, $-C_2H_4OH$, $-CH_2CH(OH)CH_3$ $-C_2H_4CN$ or $-CH_2CH_2CH_2OH$; $R_7$ is hydrogen, methyl, methoxy, $-NHCOCH_3$ or $-NHCOC_6H_5$; m is 0, 1, 2 or 3; each of $R_8$ and $R_9$ is hydrogen, halogen, nitro, methyl or methoxy; X is $-O-$, $-S-$,

or $-SO_2-$ and $X_1$ is $-O-$, $-S-$ or $-NH-$.

2. The bisazo dyestuff of claim 1 wherein A is of the formula

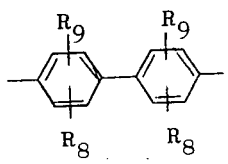

3. The bisazo dyestuff of claim 1 wherein A is of the formula

4. The bisazo dyestuff of claim 1 wherein A is of the formula

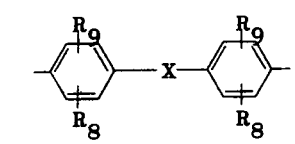

5. The bisazo dyestuff of claim 1 wherein A is of the formula

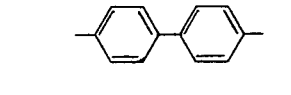

6. The bisazo dyestuff of claim 1 wherein A is of the formula

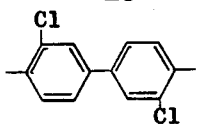

7. The bisazo dyestuff of claim 1 wherein A is of the formula

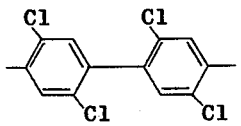

8. The bisazo dyestuff of claim 1 wherein A is of the formula

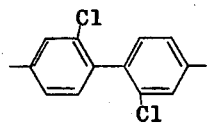

9. The bisazo dyestuff of claim 1 wherein each of $R_4$ and $R_6$ is hydrogen.

10. The bisazo dyestuff of claim 1 wherein each of $R_3$ and $R_5$ is hydrogen, methyl, ethyl, —$C_2H_4OH$, —$C_6H_5$ or

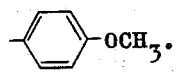

11. The bisazo dyestuff of claim 1 wherein $R_1$ is methyl and $R_2$ is cyano.

12. The bisazo dyestuff having the formula

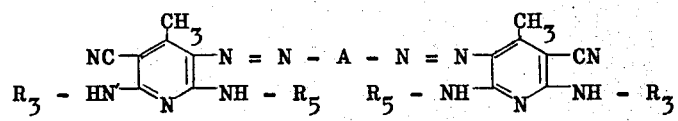

wherein each of $R_3$ and $R_5$ is hydrogen, methyl, ethyl, —$C_2H_4OH$, —$C_6H_5$ or

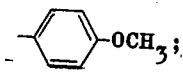

A is a radical of the formula

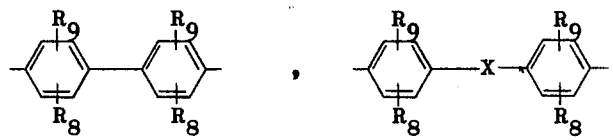

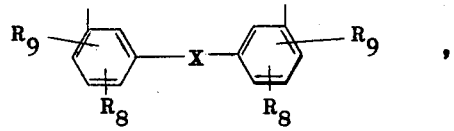

each of $R_8$ and $R_9$ is hydrogen, halogen, nitro, methyl or methoxy; X is —O—, —S—,

or —$SO_2$—.

13. The bisazo dyestuff having the formula

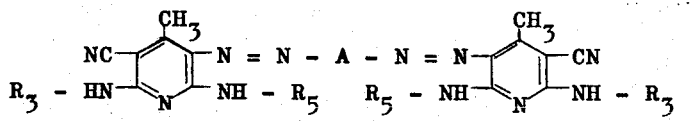

wherein each of $R_3$ and $R_5$ is hydrogen, methyl, ethyl, —$C_2H_4OH$, —$C_6H_5$ or

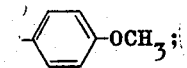

A is a radical of the formula

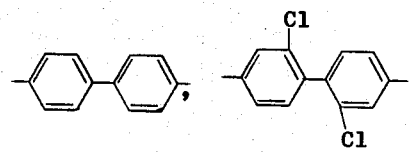

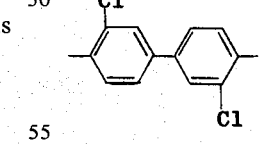 , 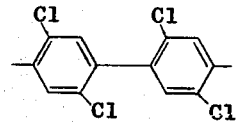 .

* * * * *